(12) United States Patent
Alkhalifah et al.

(10) Patent No.: US 8,416,644 B2
(45) Date of Patent: Apr. 9, 2013

(54) SYSTEM FOR ACQUIRING SEISMIC DATA OVER SAND DUNE SURFACES

(75) Inventors: Tariq Ali Alkhalifah, Riyadh (SA); Hashim Sari Almalki, Riyadh (SA)

(73) Assignee: King Abdul Aziz City for Science and Technology (KACST), Riyadh (SA)

( * ) Notice: Subject to any disclaimer, the term of this patent is extended or adjusted under 35 U.S.C. 154(b) by 346 days.

(21) Appl. No.: 12/825,708

(22) Filed: Jun. 29, 2010

(65) Prior Publication Data

US 2011/0317520 A1     Dec. 29, 2011

(51) Int. Cl.
*G01V 1/20* (2006.01)

(52) U.S. Cl.
USPC .......................................................... 367/177

(58) Field of Classification Search .................... 367/177
See application file for complete search history.

(56) References Cited

U.S. PATENT DOCUMENTS

| | | | |
|---|---|---|---|
| 3,921,755 A * | 11/1975 | Thigpen | 367/177 |
| 3,923,121 A * | 12/1975 | Kruppenbach et al. | 181/112 |
| 3,930,219 A * | 12/1975 | Kostelnicek | 367/177 |
| 3,934,218 A * | 1/1976 | Babb | 367/177 |
| 5,747,754 A * | 5/1998 | Svenning et al. | 367/17 |
| 5,933,789 A * | 8/1999 | Byun et al. | 702/17 |
| 6,989,841 B2 * | 1/2006 | Docherty | 345/629 |

* cited by examiner

*Primary Examiner* — Ian Lobo
(74) *Attorney, Agent, or Firm* — Timberline Patent Law Group PLLC

(57) ABSTRACT

A system for acquiring seismic data over sand dune surfaces is provided. The system includes a seismic wave generator for emitting a plurality of seismic signals into the Earth in an area covered by sand dunes. The system also includes a sand streamer for acquiring seismic data over the sand dune surfaces, such that the sand streamer includes a plurality of geophones. The plurality of geophones receive a plurality of wave signals transmitted from a subsurface corresponding to the sand dune surface, in response to emission of the plurality of seismic signals to the area of the sand dune surface by the seismic wave generator. Each geophone of the plurality of geophones is mounted on a panel wherein, one or more sides of the panel are coupled loosely to one or more rigid plates. The one or more rigid plates provide stability and mobility to assembly of panels and the plurality of geophones, thereby enabling the sand streamer to move efficiently over the surface of the sand dune. The system further includes a processor for receiving the seismic data from the sand streamer and for processing the seismic data to perform seismic survey of the sand dune surface.

14 Claims, 4 Drawing Sheets

SYSTEM FOR ACQUIRING SEISMIC DATA OVER SAND DUNE SURFACES

FIELD OF THE INVENTION

The invention generally relates to a system for acquiring seismic data over sand dune surfaces, and more specifically, to a system for acquiring seismic data over sand dune surfaces using a sand streamer.

BACKGROUND OF THE INVENTION

In oil and gas exploration determining nature of near-surface of an area of interest on the Earth is important. Therefore, geophysical exploration is conducted in various parts of the earth to identify appropriate location for oil and gas exploration. An area of interest where geophysical exploration is commonly performed may be deserts covered with sand dunes. There have been methods for performing geophysical exploration over sand dune surfaces. One such method is utilizing spiked geophones for acquiring seismic data corresponding to the sand dune surfaces. However, as the spiked geophones do not make proper contact with sand on the sand dune surface, the seismic data acquired by the spiked geophones is of poor quality. Moreover, static correction may need to be applied to the seismic data acquired by the spiked geophones to improve resolution of the seismic data. However, application of the static correction method imparts additional cost and becomes more critical when seismic acquisition takes place over sand dune surfaces.

Geophysical exploration may also be performed over the sand dune surfaces by drilling up-holes. As this method involves drilling multiple up-holes on the sand dune surface, the method is a costly way of acquiring the seismic data.

Therefore, there is a need for a method and system for accurately acquiring seismic data over sand dune surfaces in a cost effective manner.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
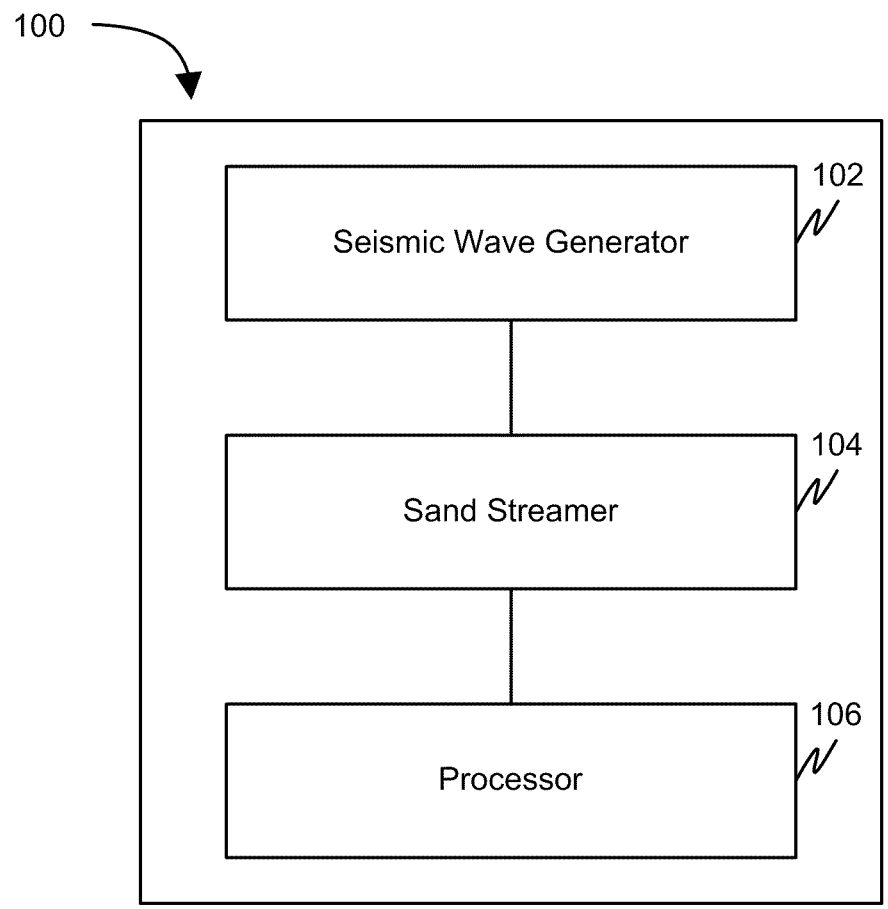
FIG. 1 is a block diagram illustrating a system for acquiring seismic data over sand dune surfaces in accordance with various embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and apparatus components related to a system for acquiring seismic data over sand dune surfaces. Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises", "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments described herein may be comprised of one or more conventional processors and unique stored program instructions that control the one or more processors to implement, in conjunction with certain non-processor circuits, some, most, or all of the functions of method and apparatus for communication in a wireless communication system. The non-processor circuits may include, but are not limited to, a radio receiver, a radio transmitter, signal drivers, clock circuits, power source circuits, and user input devices.

Generally speaking, pursuant to various embodiments, the invention provides a system for acquiring seismic data over sand dune surfaces. The system includes a seismic wave generator for emitting a plurality of seismic signals into the Earth in an area covered by sand dunes. The system also includes a sand streamer for acquiring seismic data over the sand dune surfaces, such that the sand streamer includes a plurality of geophones. The plurality of geophones receive a plurality of wave signals transmitted from a subsurface corresponding to the sand dune surface, in response to emission of the plurality of seismic signals to the area of the sand dune surface by the seismic wave generator. Each geophone of the plurality of geophones is mounted on a panel wherein, one or more sides of the panel are coupled loosely to one or more rigid plates. The one or more rigid plates provide stability and mobility to assembly of the panels and the plurality of geophones, thereby enabling the sand streamer to move efficiently over the surface of the sand dune.

Apart from the sand streamer, the system also includes a processor for receiving the seismic data from the sand streamer and for processing the seismic data. The processor is configured to process signal quality of the plurality of wave signals transmitted from the subsurface corresponding the sand dune surface. The processor estimates a stacking velocity associated with each wave signal of a set of wave signals of the plurality of wave signals. Each wave signal of the set of signals corresponds to a common mid-point (CMP) of a plurality of CMPs. The stacking velocity is a function of a travel time of a wave signal of the set of wave signals and a travel time of a seismic signal of the plurality of seismic signals corresponding to the wave signal, a ray parameter, and a CMP interval. The CMP interval is a distance between two consecutive CMPs of the plurality of CMPs.

FIG. 1 is a block diagram illustrating a system 100 for acquiring seismic data over sand dune surfaces. System 100 includes a seismic wave generator 102, a sand streamer 104, and a processor 106.

Seismic wave generator 102 emits a plurality of seismic signals into the Earth in an area covered by the sand dunes. Examples of seismic wave generator 102 include, but are not limited to explosives, an air gun, a vibrator, and a weight drop vehicle. Seismic wave generator 102 may be ignited to apply shots on the Earth surface to produce the plurality of seismic signals. In an embodiment, seismic wave generator 102 produces multiple acoustic pulses over time in order to emit the plurality of seismic signals continuously. The plurality of seismic signals may include different types of seismic waves. The seismic waves may include, but are not limited to Primary waves (P-waves) and Secondary waves (S-waves).

In an embodiment, seismic wave generator 102 may move along the area of the sand dune surface in one or more directions. Seismic wave generator 102 may be moved by mounting seismic wave generator 102 on a vehicle. Therefore, seismic wave generator 102 may be able to emit the plurality of seismic signals from different points or different directions on the area of the sand dune surface. The plurality of seismic signals travel through a subsurface of the area covered by the sand dunes.

Thereafter, seismic data associated with the area of the sand dune surface is acquired from the plurality of seismic signals. In order to acquire the seismic data, system 100 uses sand streamer 104. Sand streamer 104 is capable of moving along with seismic wave generator 102 on the area of the sand dune surface. Sand streamer 104 may be connected directly to seismic wave generator 102 that moves on the sand dune surface. Alternatively, sand streamer 102 may be connected to a vehicle mounted with seismic wave generator 102. Thus, while moving on the area of the sand dune surface, sand streamer 104 acquires the seismic data.

Sand streamer 102 includes different parts which are not shown in FIG. 1. Sand streamer 102 includes a plurality of geophones. The plurality of geophones receive a plurality of wave signals transmitted from the subsurface corresponding to the sand dune surface in response to emission of the plurality of seismic signals. As the plurality of seismic signals are obstructed by the subsurface, the plurality of wave signals are transmitted from the subsurface, such that the plurality of wave signals are either reflected or refracted from the subsurface. For example, a seismic signal of the plurality of seismic signals may be obstructed at a base of the sand dune. This results in reflection of the seismic signal at an angle to obtain a wave signal of the plurality of wave signals. The wave signal is then received by a geophone of the plurality of geophones.

In an embodiment, the plurality of geophones may be arranged in a line and connected to seismic wave generator 102. This arrangement enables the plurality of geophones to receive the seismic data across the area of the sand dune surface to perform a two dimensional seismic analysis. In another embodiment, the plurality of geophones are arranged, such that a plurality of sets of geophones of the plurality of geophones are arranged in parallel. Further, each geophone in a set of geophones of the plurality of sets of geophones is arranged in a line. This arrangement enables the plurality of geophones to receive the seismic data across the area of the sand dune surface to perform a three dimensional seismic analysis. For example, three sets of geophones may be arranged in parallel to each other and connected to a vehicle mounted with seismic wave generator 102. As the three sets of geophones are arranged in parallel a seismic analysis of an area of the sand dune surface can be performed from different directions.

Each geophone of the plurality of geophones is mounted on a panel. One or more sides of the panel are loosely coupled to one or more rigid plates. The one or more rigid plates provide stability and mobility to assembly of the panels and the plurality of geophones, thereby enabling the sand streamer to move efficiently over the sand dune surface. The various parts and design of sand streamer 104 are explained in detail in conjunction with FIG. 2a and FIG. 2b, FIG. 3 and FIG. 4.

The seismic data acquired by sand steamer 104 is processed by a processor 106. Processor 106 may be a hardware or software entity capable of performing computation. In an embodiment, processor 106 is placed near to sand streamer 104 to receive the seismic data. For example, processor 106 may be placed in a vehicle mounted with seismic wave generator 102. Processor 106 may be communicably connected to sand streamer 104. Alternatively, processor 106 may be placed remotely to sand streamer 104. In this case, the seismic data is received by processor 106 from sand streamer 104 through a wireless communication.

Processor 106 then processes the seismic data. The seismic data may include, electrical voltage changes recorded by the plurality of geophones in response to receiving the plurality of wave signals. Processor 106 performs correction over the seismic data to remove noise from the seismic data and improve resolution of the seismic data. Correction may be performed by processing the seismic data to compensate for geometrical spreading of the plurality of wave signals. This is achieved by performing a gain correction over the seismic data. Additionally, band bass filters may be utilized to filter data of low frequencies from the seismic data to concentrate on the seismic data having high frequencies.

Processor 106 utilizes the seismic data to identify one or more seismic information associated with the area of the sand dune surface, such as a travel time of a wave signal of the set of wave signals and a travel time of a seismic signal of the plurality of seismic signals corresponding to the wave signal, information about a plurality of Common mid points (CMPs), ray parameter, and so forth.

Thereafter, processor 106 estimates a stacking velocity from a seismic data associated with each wave signal of a set of wave signals. The set of wave signals are selected from the plurality of wave signals, such that each wave signal of the set of wave signals corresponds to a CMP of the plurality of CMPs. The seismic data across the plurality of CMPs is collected as seismic wave generator 102 and sand streamer 104 are moved in one or more directions on the area of the sand dune surface.

The stacking velocity may be a function of a travel time of a wave signal of the set of wave signals and a travel time of a seismic signal of the plurality of seismic signals corresponding to the wave signal, a ray parameter, and a CMP interval. The CMP interval is a distance between two consecutive CMPs of the plurality of CMPs. In an embodiment, when the plurality of geophones are arranged in a line from seismic wave generator 102, a two dimensional seismic analysis is performed over the area of the sand dune surface. For the two dimensional seismic analysis, the stacking velocity is estimated based on equation 1.

$$t(m, X, v, p) = \sqrt{(t_0 + mp)^2 + \frac{(1 - v^2 p^2) X^2}{v^2}} \quad (1)$$

Wherein, t(m, X, v, p) is the travel time of a wave signal of the set of wave signals and the travel time of a seismic signal of the plurality of seismic signals corresponding to the wave signal;

$t_0$ is offset travel time;

m is the CMP interval;

p is the ray parameter;

v is the stacking velocity; and $$X = g - s$$

wherein, g is location of a geophone; and s is location of the moving seismic wave generator.

Therefore, the stacking velocity is estimated as a summation over multiple CMPs. Summation over multiple CMPs enables improved stability and resolution of the stacking velocity. Moreover, better signal to noise ratio is achieved for the estimation of the stacking velocity.

In another embodiment, when the plurality of geophones are arranged such that, a plurality of sets of geophones of the plurality of geophones are arranged in parallel from seismic wave generator 102, the acquired seismic data is utilized to perform a three dimensional seismic analysis of the area of the sand dune surface. For the three dimensional seismic analysis, the stacking velocity is estimated based on equation 2.

$$t(v, p_x, p_y) = \sqrt{(t_0 + m_x p_x + m_y p_y)^2 + \frac{(1 - v^2 p_x^2) X_x^2 + (1 - v^2 p_y^2) X_y^2}{v^2}} \quad (2)$$

Wherein, $t(v, p_x, p_y)$ is the travel time of a wave signal of the set of wave signals and the travel time of a seismic signal of the plurality of seismic signals corresponding to the wave signal;

$t_0$ is offset travel time;

$m_x$ is the CMP interval in x-direction;

$m_y$ is the CMP interval in y-direction;

$p_x$ is the ray parameter in x-direction;

$p_y$ is the ray parameter in y-direction;

v is the stacking velocity;

$$X_x = g - s$$

wherein, g is location of a geophone in x-direction;

is location of the moving seismic wave generator in x-direction;

$$X_y = g - s$$

wherein, g is location of a geophone in y-direction; and s is location of the moving seismic wave generator in y-direction.

The stacking velocity may be estimated by processor 106 utilizing any other methods known in the art. The stacking velocity estimated by processor 106 is utilized for performing geophysical exploration of the area of the sand dune surface. Based on the stacking velocity, a velocity profile for the area of the sand dune surface may be plotted. The stacking velocity may be also utilized to estimate a depth of base of the sand dune surface. The depth of the base of the sand dune surface may be estimated at each CMP of the plurality of CMPs. The depth of the sand dune surface may be estimated using one or more methods known in the art.

Figure 2A:
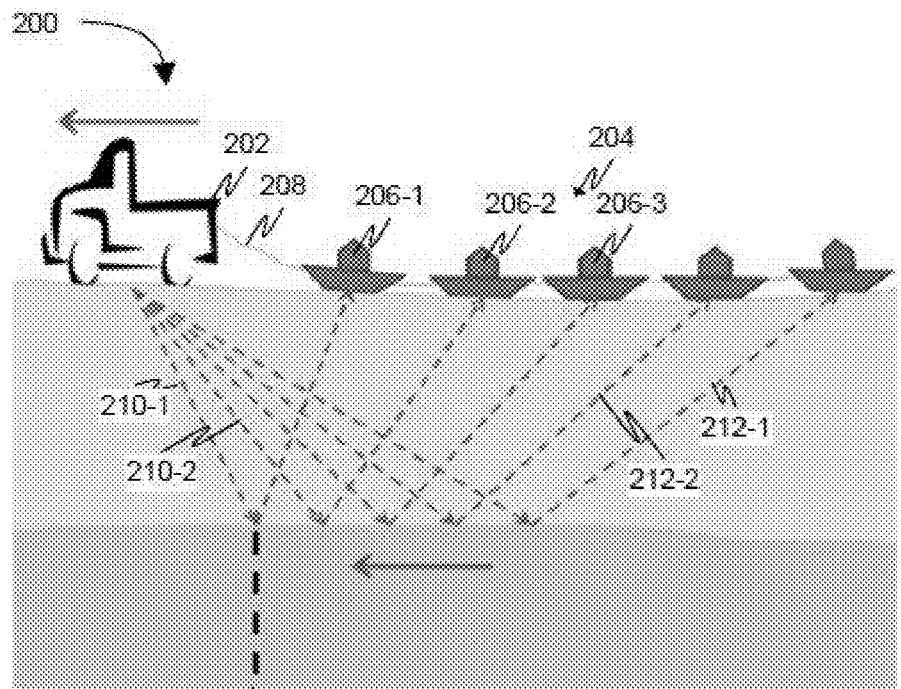
FIG. 2a is an exemplary illustration of an environment in which a system performs a seismic survey of sand dune surface in accordance with an embodiment of the invention.

FIG. 2a is an exemplary illustration of an environment 200 in which system 100 performs a seismic survey of a sand dune surface in accordance with an embodiment of the invention. As shown in FIG. 2a, system 100 is placed over the sand dune surface. System 100 includes a vehicle 202 mounted with seismic wave generator 102 (not shown in FIG. 2a). Vehicle 202 is connected with sand streamer 204. Further, vehicle 202 may include processor 106 (not shown in FIG. 2a). Sand streamer 204 includes a plurality of geophones 206-n, such as a geophone 206-1, a geophone 206-2, and a geophone 206-3. Each geophone 206-n is mounted on a panel which is connected with a rigid plate. Assembly of the panel and the rigid plate with geophone 206-n is explained in detail in conjunction with FIG. 3 and FIG. 4.

Sand streamer 204 further includes a connecting member 208 for connecting plurality of geophones 206-n with vehicle 202. Further, connecting member 208 connects each geophone of plurality of geophones 206-n. Examples of connecting member 208 include, but are not limited to a cable, a pipe, a hose pipe, a webbing, a rubber conveyer and so forth. Connecting member 208 connects plurality of geophones 206-n and supports movement of sand streamer 204 with vehicle 202. In an embodiment, connecting member 208 connects plurality of geophones 206-n in a line in such a manner that equidistant gaps are maintained between each geophone of plurality of geophones 206-n. Alternatively, variable gaps may be maintained between each geophone of plurality of geophones 206-n.

In order to perform the seismic survey on the area of the sand dune surface seismic wave generator 102 in vehicle 202 is ignited to produce a plurality of seismic signals 210-n, such as seismic signal 210-1, seismic signal 210-2 and so forth. Simultaneously, vehicle 202 is moved on the area of the sand dune surface in one direction. Movement of vehicle 202 results in dragging of sand streamer 204 over the area. In an embodiment, speed of vehicle 202 is maintained such that no tension is developed in connecting member 208 of sand streamer 204.

When plurality of seismic signals 210-n traverse through subsurface of the sand dune surface, plurality of seismic signals 210-n are obstructed by base of the sand dune. As a result, plurality of seismic signals 210-n are reflected from the base and are received by plurality of geophones 206-n as a plurality of wave signals 212-n, such as wave signal 212-1, wave signal 212-2 and so forth. Sand streamer 204 utilizes plurality of wave signals 212-n to provide seismic data corresponding to the sand dune surface to processor 106. Processor 106 may be mounted on vehicle 202. Thereafter, processor 106 performs correction over the seismic data to remove noise and to improve resolution of the seismic data, in real time. Further, processor 106 estimates stacking velocity of each wave signal of a set of wave signals, by utilizing equation 1. The set of wave signals correspond to a plurality of CMPs, which are identified while vehicle 202 is moving over the area of the sand dune surface. Processing performed by processor 106 corresponding to correction of the seismic data and estimation of the stacking velocity has been explained in detail in conjunction with FIG. 1.

Figure 2B:
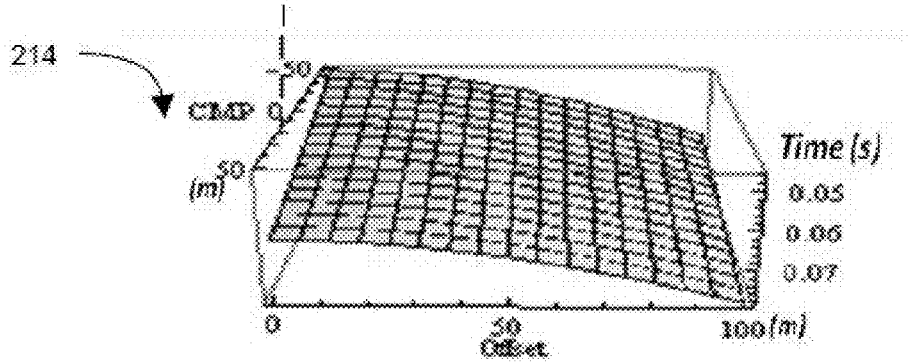
FIG. 2b illustrates a graph obtained by the system based on the seismic survey performed over the sand dune surface in accordance with an embodiment of the invention.

FIG. 2b illustrates a graph 214 obtained by system 100 based on the seismic survey performed over the sand dune surface in accordance with an embodiment of the invention. Based on stacking velocity estimated by processor 106, velocity profile at the sand dune surface is plotted in graph 214. Graph 214 includes X, Y, and Z axis, where X axis indicates offsets between seismic wave generator 102 and plurality of geophones 206-$n$. Y axis indicates the plurality of CMPs and Z axis indicates travel time of plurality of seismic signals 210-$n$ and travel time of plurality of wave signals 212-$n$.

Figure 3A:
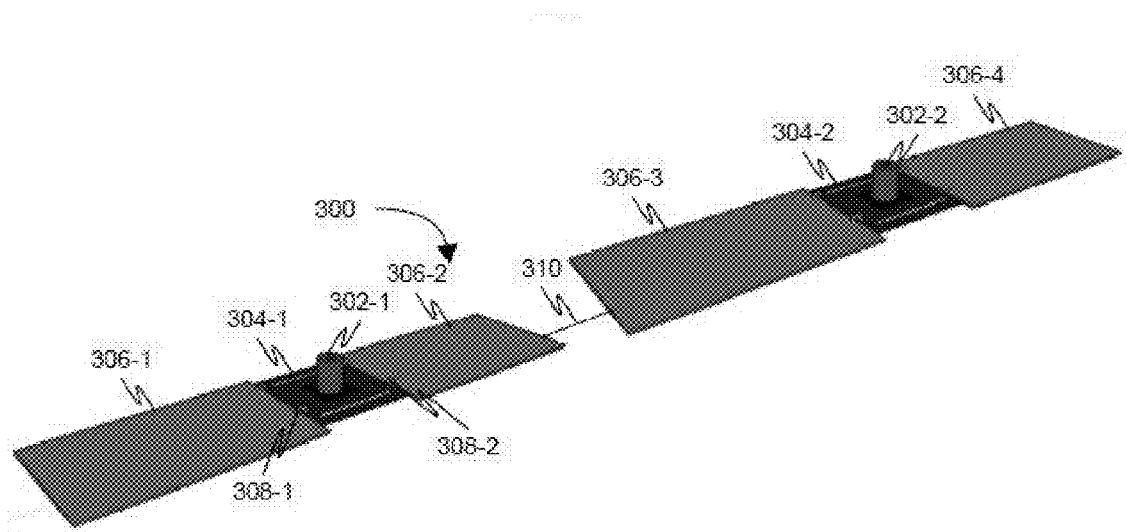
FIG. 3a and FIG. 3b illustrate a side top view and a side bottom view of a sand streamer in accordance with an embodiment of the invention.
Figure 3B:
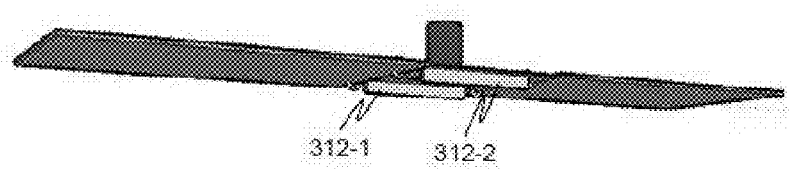

FIG. 3$a$ illustrates a side-top view of a sand streamer 300 in accordance with an embodiment of the invention. Sand streamer 300 includes a plurality of geophones 302-$n$, such as geophone 302-1 and geophone 302-2. Plurality of geophones 302-$n$ are capable of receiving a plurality of wave signals transmitted from a subsurface corresponding to a sand dune surface. It may be apparent to a person skilled in art that various types of geophones may be used as plurality of geophone 302-$n$. Further, various known sensors which are capable of receiving the plurality of wave signals transmitted from the subsurface, may be used instead of plurality of geophones 302-$n$.

Each geophone of plurality of geophones 302-$n$ are mounted on a panel 304-$n$. For example, geophone 302-1 is mounted on panel 304-1. Panel 304-$n$ may be a metal plate or a plastic plate. Further, panel 304-$n$ may have a shape that is capable of supporting a geophone. For example, panel 304-$n$ may have as a square shape or a rectangle shape.

One or more sides of panels 304-$n$ are loosely coupled with one or more rigid plates 306-$n$. For example, alternate sides of panel 304-1 are loosely coupled with rigid plate 306-1 and rigid plate 306-2. One or more rigid plates 306-$n$ are connected with sides of panel 304-$n$ by means of one or more coupling members 308-$n$. In an embodiment, one or more coupling members 308-$n$ may be rings. It will be apparent to a person skilled in the art that other coupling units known in the art which provide loose coupling joints may be used as one or more coupling members 308-$n$. Such a loose coupling between one or more rigid plates 306-$n$ and panels 304-$n$ provides mobility to plurality of geophones 302-$n$ and panels 304-$n$ on the sand dune surface.

A rigid plate of one or more rigid plates 306-$n$ may be a square plate or a rectangle plate. Further, one or more rigid plates 306-$n$ are prepared from materials which impart weight in one or more rigid plates 306-$n$. For example, a rigid plate may be a thick plate prepared from an iron material. The weight of one or more rigid plates 306-$n$ enables plurality of geophones 302-$n$ and panels 304-$n$ to rest on the sand dune surface with stability. Further, due to weight of one or more rigid plates 306-$n$, plurality of geophones 302-$n$ do not lose contact with the sand dune surface when sand streamer 300 moves on the sand dune surface.

In an embodiment, an assembly of a geophone of plurality of geophones 302-$n$, panel 304-$n$ and one or more rigid plate 306-$n$ is connected with another such assembly using a connecting member 310. Examples of connecting member 310 include, but are not limited to a cable, a pipe, a hose pipe, a webbing, a rubber conveyer, and so forth. Each geophone of plurality of geophones 302-$n$ are connected to each other using connecting member 310. Further, connecting member 310 connects plurality of geophones 302-$n$ to a vehicle. In an embodiment, each geophone of plurality of geophones 302-$n$ are connected to each other using multiple connecting members. Connecting member 310 supports movement of sand streamer 300 with the vehicle on the sand dune surface. In an embodiment, connecting member 310 connects plurality of geophones 302-$n$ in a line wherein equidistant gaps are maintained between each geophone of plurality of geophones 302-$n$. Alternatively, variable gaps may be maintained between each geophone of plurality of geophones 302-$n$.

FIG. 3$b$ illustrates side-bottom view of sand streamer 300 in accordance with an embodiment of the invention. As shown in FIG. 3$b$ panel 304-$n$ may further include one or more strips 312-$n$ at bottom of panel 304-$n$. One or more strips 312-$n$ may be rubber strips that provide mobility to the assembly of plurality of geophones 302-$n$, panel 304-$n$ and one or more rigid plate 306-$n$.

Figure 4:
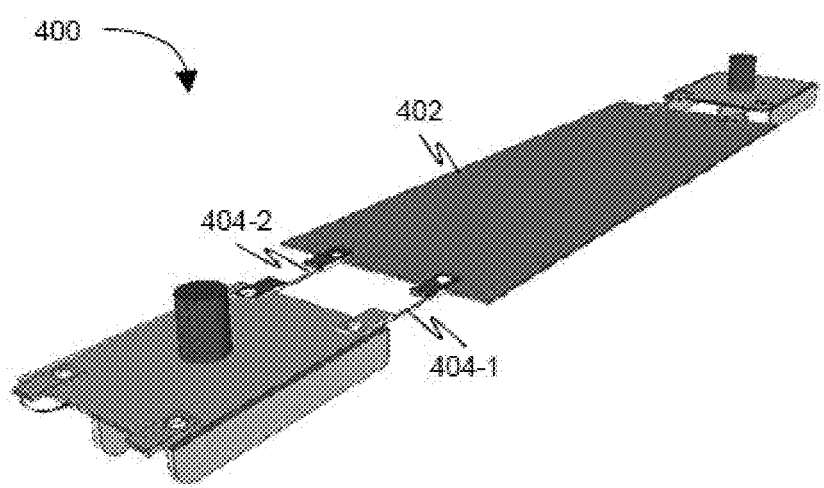
FIG. 4 illustrates a sand streamer in accordance with another embodiment of the invention.

FIG. 4 illustrates a sand streamer 400 in accordance with another embodiment of the invention. As shown in FIG. 4, sand streamer 400 includes a plurality of geophones. Each geophone of the plurality of geophones is mounted on a panel. The plurality of geophones and the panels are explained in detail in conjunction with FIG. 3$a$ and FIG. 3$b$. Sand streamer 400 further includes one or more rigid plates, such as rigid plate 402. Each rigid plate of the one or more rigid plates is loosely coupled on sides of the panels which are consecutively placed in sand streamer 400. Loose coupling between the rigid plate and the panels is achieved by utilizing one or more coupling members 404-$n$, such as coupling member 404-1 and coupling member 404-2. One or more coupling members 404-$n$ may be metal strips which are joint at sides of the panels and the rigid plate.

Various embodiments of the invention provide a system for acquiring seismic data over the sand dune surfaces. The system includes a sand streamer which is designed, such that stability and mobility is achieved over the sand dune surface. Further, the design of the sand streamer enables efficient acquisition of seismic data over the sand dune surface without drilling up-holes in the sand dunes. Therefore, the seismic data is acquired in a cost effective manner without causing any hazard to the environment. As the seismic data is acquired by moving the sand streamer in an area of the sand dune surface, the seismic data is acquired over multiple CMPs. Such seismic data includes a small dataset which is easy to process. Further, velocity profile prepared from such seismic data is approximate as the velocity is determined by summation over multiple CMPs. In addition, effect of large offset and changes of reflection coefficient with the offset on seismic data is minimized in the acquired seismic data. Therefore, overall an efficient system is provided which enables accurate acquisition of the seismic data in a cost effective manner. Such a system may be used effectively in performing seismic survey over the sand dune surface and in determination of base of the sand dune surface during oil and gas exploration and in other applications.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A system for acquiring seismic data over sand dune surfaces, the system comprising:
   a seismic wave generator for emitting a plurality of seismic signals into Earth in an area covered by sand dunes;
   a sand streamer for acquiring seismic data over an area of a sand dune surface, wherein the sand streamer comprises:
      a plurality of geophones for receiving a plurality of wave signals transmitted from the subsurface of the area of a sand dune surface in response to the plurality of seismic signals emitted to the area of the sand dune surface;
      a panel for mounting each geophone of the plurality of geophones; and
      at least one rigid plate loosely coupled to the panel, wherein each of the at least one rigid plate is loosely coupled to at least one side of the panel, whereby the at least one rigid plate imparts mobility and stability to the panel and a geophone of the plurality of geophones mounted on the panel, over the area of the sand dune surface;
      mobility strips attached to a bottom side of each panel to provide stability and decrease friction in sand;
   a processor for receiving and processing the seismic data from the sand streamer, wherein the processor is configured to:
      perform correction over the seismic data; and
      estimate a stacking velocity associated with each wave signal of a set of wave signals of the plurality of wave signals, wherein the each wave signal of the set of wave signals corresponds to a common mid-point (CMP) of a plurality of CMPs, wherein the stacking velocity is a function of a travel time of a wave signal of the set of wave signals and a travel time of a seismic signal of the plurality of seismic signals corresponding to the wave signal, a ray parameter, and a CMP interval, wherein the CMP interval is a distance between two consecutive CMPs of the plurality of CMPs.

2. The system of claim 1, wherein the sand streamer is capable of moving along with the seismic wave generator on the area of the sand dune surface.

3. The system of claim 1, wherein the plurality of geophones in the sand streamer are arranged in a line.

4. The system of claim 3, wherein the processor is configured to estimate the stacking velocity based on an equation:

$$t(m, X, v, p) = \sqrt{(t_0 + mp)^2 + \frac{(1 - v^2 p^2)X^2}{v^2}}$$

wherein,
$t(m, X, v, p)$ is the travel time of a wave signal of the set of wave signals and the travel time of a seismic signal of the plurality of seismic signals corresponding to the wave signal;
$t_0$ is offset travel time;
m is the CMP interval;
p is the ray parameter;
v is the stacking velocity; and $X = g - s$ wherein,
g is location of a geophone; and
s is location of the moving seismic wave generator.

5. The system of claim 1, wherein a plurality of sets of geophones of the plurality of geophones are arranged in parallel, wherein each geophone in a set of geophones of the plurality of sets of geophones is arranged in a line.

6. The system of claim 5, wherein the processor is configured to estimate the stacking velocity in 3-D media based on an equation:

$$t(v, p_x, p_y) = \sqrt{(t_0 + m_x p_x + m_y p_y)^2 + \frac{(1 - v^2 p_x^2)X_x^2 + (1 - v^2 p_y^2)X_y^2}{v^2}}$$

wherein,
$t(v, p_x, p_y)$ is the travel time of a wave signal of the set of wave signals and the travel time of a seismic signal of the plurality of seismic signals corresponding to the wave signal;
$t_0$ is offset travel time;
$m_x$ is the CMP interval in x-direction;
$m_y$ is the CMP interval in y-direction;
$p_x$ is the ray parameter in x-direction;
$p_y$ is the ray parameter in y-direction;
v is the stacking velocity;

$X_x = g - s$ wherein,
g is location of a geophone in x-direction;
s is location of the moving seismic wave generator in x-direction;

$X_y = g - s$ wherein,
g is location of a geophone in y-direction; and
s is location of the moving seismic wave generator in y-direction.

7. The system of claim 1, wherein the panel of the sand streamer is one of a metal sheet and a plastic sheet.

8. The system of claim 1, wherein the at least one rigid plate of the sand streamer is loosely coupled to at least one side of the panel by means of at least one coupling member.

9. The system of claim 1, wherein a rigid plate of the at least one rigid plate of the sand streamer is one of a square plate and a rectangular plate.

10. The system of claim 1, wherein the sand streamer further comprises at least one connecting member for connecting each geophone of the plurality of geophones in a line.

11. The system of claim 10, wherein a connecting member of the at least one connecting member of the sand streamer is one of a cable, a rubber conveyer, and a webbing.

12. The system of claim 10, wherein the at least one connecting member of the sand streamer connects the plurality of geophones in at least one line, wherein an equidistant gap is maintained between adjacent geophones of the plurality of geophones.

13. The system of claim 10, wherein the at least one connecting member of the sand streamer connects the plurality of geophones in at least one line, wherein a plurality of gaps are maintained between the plurality of geophones.

14. The system of claim 1, wherein the processor is further configured to determine a depth of base of the sand dune surface at each CMP of the plurality of CMPs based on the stacking velocity estimated at each CMP of the plurality of CMPs.

* * * * *